United States Patent
Kennedy

(10) Patent No.: US 11,319,962 B2
(45) Date of Patent: May 3, 2022

(54) VEHICLE AND SYSTEM AND METHOD OF CONTROLLING AIR MOVEMENT WITH A FAN OF A VEHICLE

(71) Applicant: DEERE & COMPANY, Moline, IL (US)

(72) Inventor: Thomas L. Kennedy, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 292 days.

(21) Appl. No.: 16/654,117

(22) Filed: Oct. 16, 2019

(65) Prior Publication Data

US 2021/0115934 A1  Apr. 22, 2021

(51) Int. Cl.
  *F04D 27/00* (2006.01)
  *F04D 29/38* (2006.01)
  *F04D 19/00* (2006.01)
  *B60K 11/02* (2006.01)

(52) U.S. Cl.
  CPC ......... *F04D 27/001* (2013.01); *F04D 19/002* (2013.01); *F04D 29/38* (2013.01); *B60K 11/02* (2013.01)

(58) Field of Classification Search
  CPC ....... F04D 27/001; F04D 19/002; F04D 29/38
  See application file for complete search history.

(56) References Cited

U.S. PATENT DOCUMENTS

| 7,984,574 | B2 | 7/2011 | Pfohl et al. | |
| 2016/0263964 | A1* | 9/2016 | Wall | B60H 1/00985 |
| 2017/0320457 | A1* | 11/2017 | Kakimoto | B60H 1/00 |
| 2019/0009640 | A1* | 1/2019 | Oga | G01V 9/005 |
| 2019/0366801 | A1* | 12/2019 | Nakashima | B60H 1/00985 |

FOREIGN PATENT DOCUMENTS

| DE | 102019113575 A1 | 11/2019 |
| GB | 2489109 A | 9/2012 |
| JP | 2018040295 A | 3/2018 |
| JP | 2020159242 A | 10/2020 |

OTHER PUBLICATIONS

German Search Report issued in counterpart application No. 102020212960.6 dated May 18, 2021 (10 pages).

* cited by examiner

*Primary Examiner* — Patrick Hamo

(57) ABSTRACT

A vehicle, a system, and a method for controlling air movement through the vehicle with a fan of the vehicle is provided. The vehicle includes the fan mounted to the vehicle and configured to move air at a fan end of the vehicle, an object detector mounted at the fan end of the vehicle and configured to detect an object within a detection distance from the fan end of the vehicle, and a controller configured to control actuation of the fan based on detection of the object within the detection distance at the fan end of the vehicle.

20 Claims, 3 Drawing Sheets

VEHICLE AND SYSTEM AND METHOD OF CONTROLLING AIR MOVEMENT WITH A FAN OF A VEHICLE

BACKGROUND

Vehicles may be operated in a forward mode in which the vehicle travels in a certain direction, often the direction the operator is facing, and a reverse mode, often the opposite direction of the direction the operator is facing. Vehicles may be operated in the forward mode and the reverse mode at an operating location, including, in a non-limiting example, at a work site having one or more objects, including a pile, stack, mound, collection, or other mass of objects that may be located near the vehicle. Additionally, vehicles may include radiators, coolers, and/or other heat exchanger(s) and one or more fans that move air through or around the heat exchanger(s) in order to cool one or more fluids of an engine, motor, or other component of the vehicle.

SUMMARY

Various aspects of examples of the present disclosure are set out in the claims.

In accordance with an embodiment of the present disclosure, a vehicle includes a fan mounted to the vehicle and configured to move air at a fan end of the vehicle, an object detector mounted at the fan end of the vehicle and configured to detect an object within a detection distance from the fan end of the vehicle, and a controller configured to control actuation of the fan based on detection of the object within the detection distance at the fan end of the vehicle.

The fan may be configured to move air in an outward direction from the fan end of the vehicle and in an inward direction opposite from the outward direction. The controller may be configured to control actuation of the fan to limit movement of air in the inward direction based on detection of the object within the detection distance at the fan end of the vehicle. The controller may be further configured to control a speed of the fan based on detection of the object within the detection distance at the fan end of the vehicle. The controller may be configured to control a speed of the fan based on detection of the object within the detection distance at the fan end of the vehicle. The controller may be configured to control a blade pitch angle of the fan based on detection of the object within the detection distance at the fan end of the vehicle. The object detector may be further configured to determine an object distance of the object from the fan end of the vehicle within the detection distance, and the controller may be further configured to control actuation of the fan to be proportional to the object distance of the object from the fan end of the vehicle. The vehicle may be configured to operate in a travel direction state of one of a forward travel direction and a reverse travel direction opposite from the forward travel direction. The fan may be configured to move air in an outward direction from the fan end of the vehicle and an inward direction into the vehicle at the fan end and opposite from the outward direction, and the controller may be configured to control actuation of the fan to limit movement of air in the inward direction based on detection of the object within the detection distance at the fan end of the vehicle and operation of the vehicle in a travel direction state opposite from the inward direction.

In accordance with an embodiment of the present disclosure, a system for controlling air movement through a vehicle with a fan of the vehicle includes an object detector configured to detect an object within a detection distance from the vehicle, and a controller configured to control actuation of the fan based on detection of the object within the detection distance.

In accordance with an embodiment of the present disclosure, a method of controlling air movement through a vehicle with a fan of the vehicle includes moving the vehicle toward an object, detecting an object within a detection distance at a fan end of the vehicle, and controlling actuation of the fan based on the detecting of the object within the detection distance at the fan end of the vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
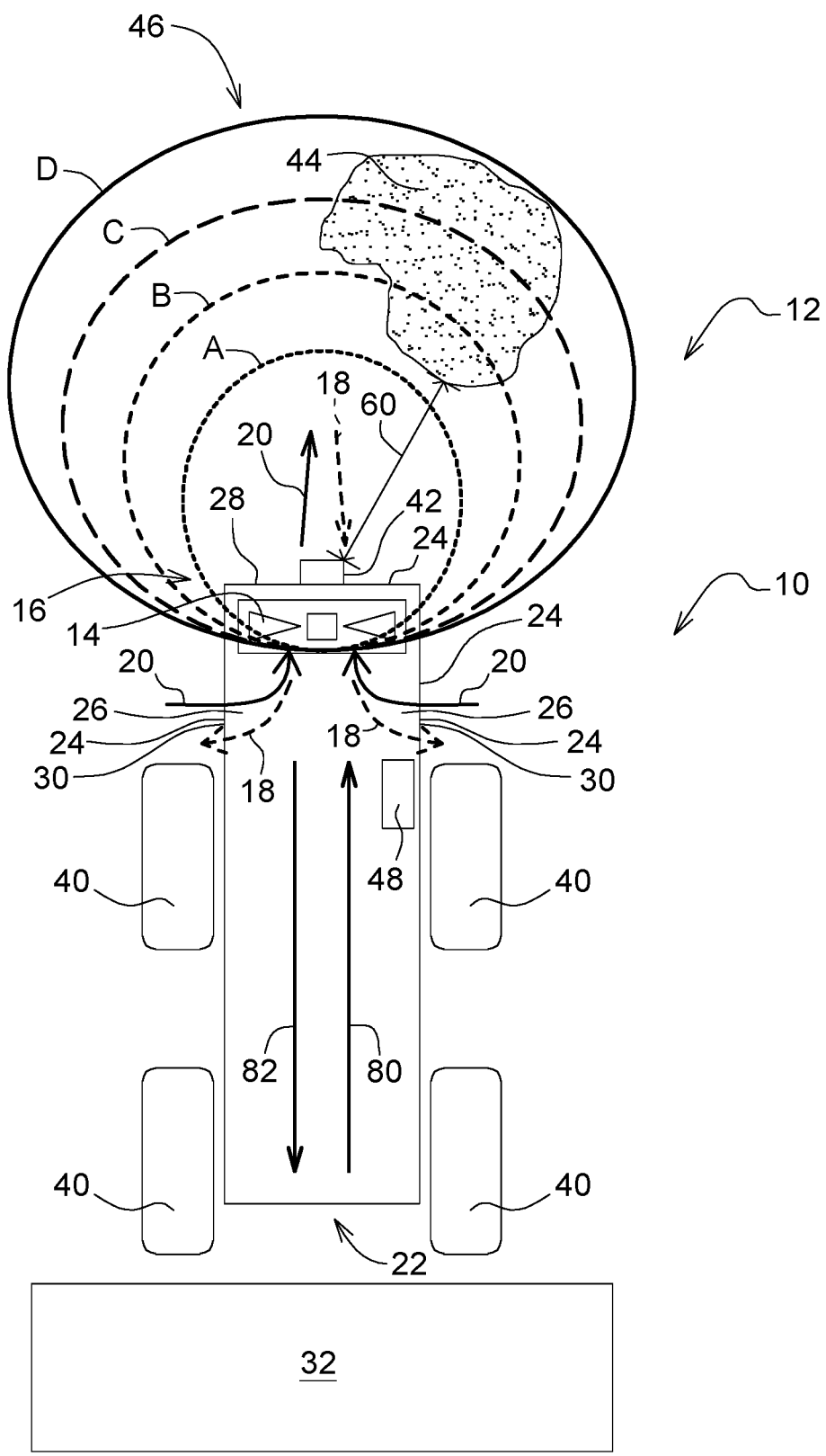
FIG. 1 illustrates a vehicle and a system for controlling air movement through a vehicle with a fan of the vehicle in accordance with an embodiment of the present disclosure.
Figure 2:
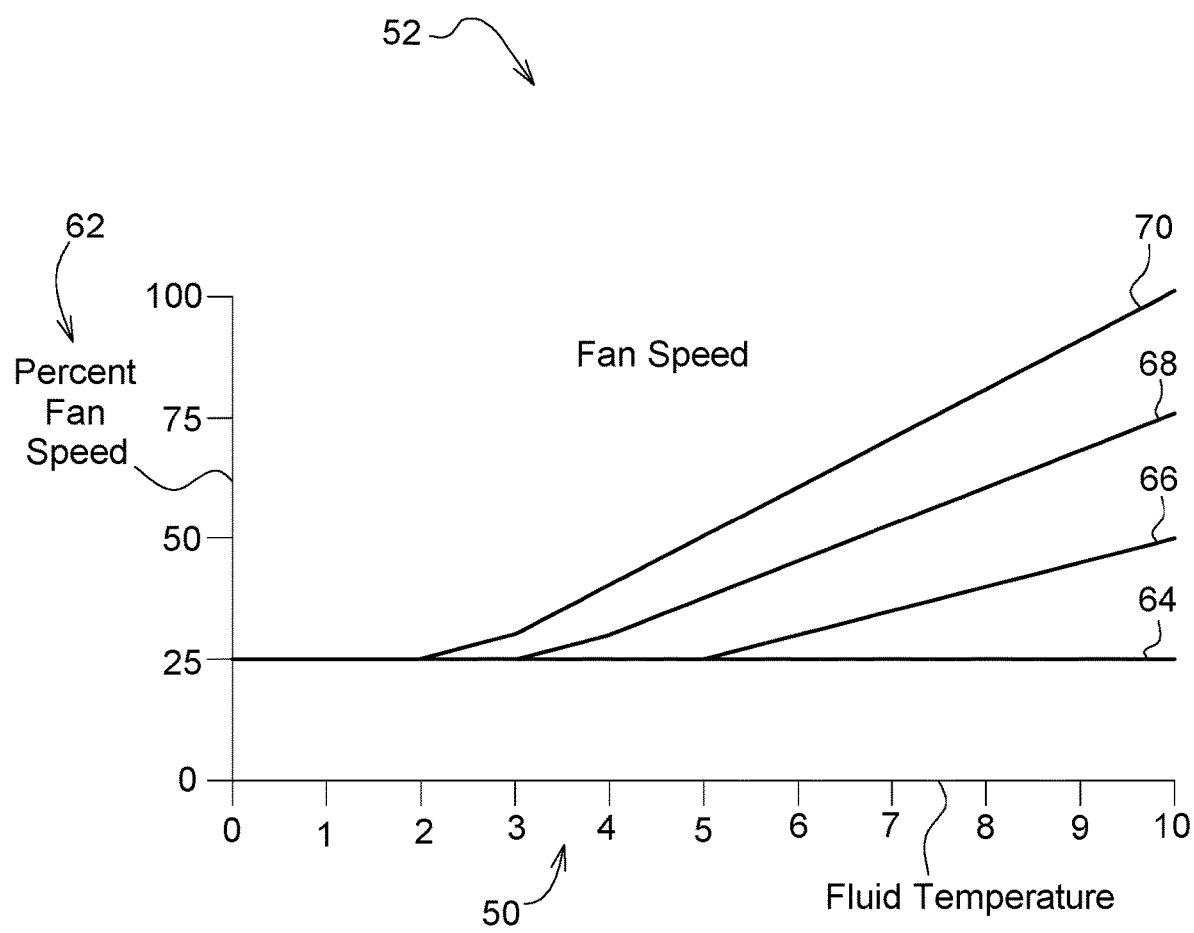
FIG. 2 illustrates fan speed for temperature and detection of an object within a detection distance in accordance with an embodiment of the present disclosure.
Figure 3:
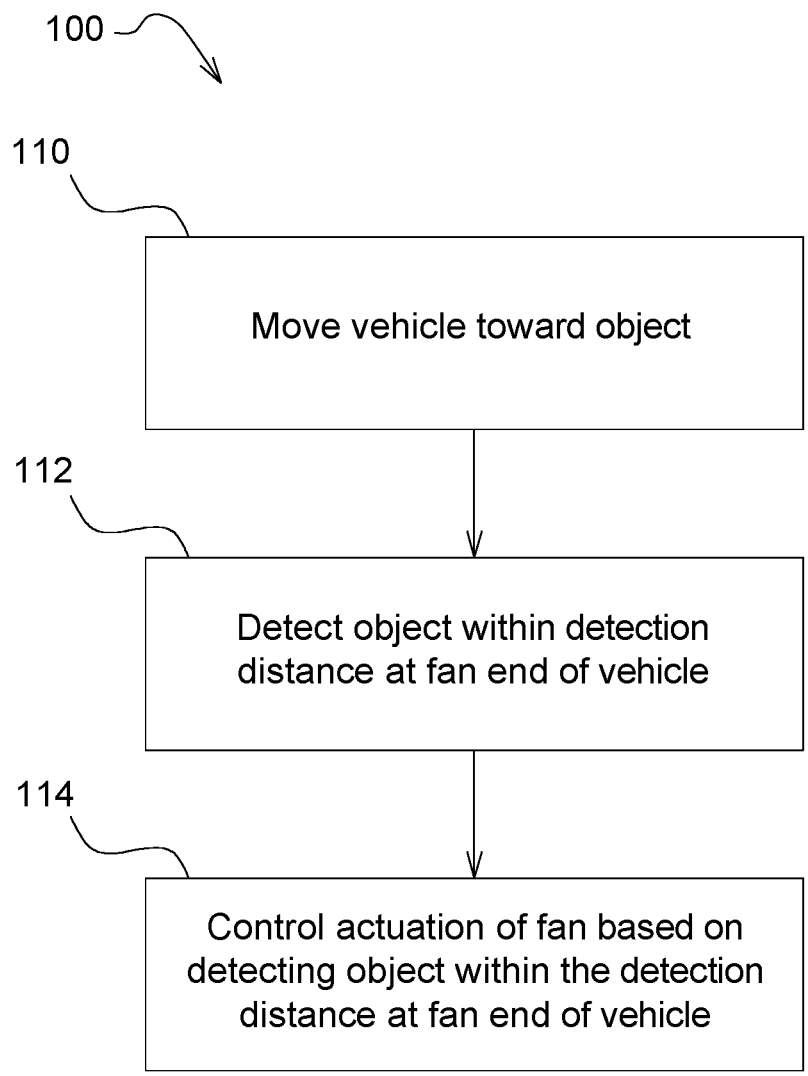
FIG. 3 illustrates a method of controlling air movement through a vehicle with a fan of the vehicle in accordance with an embodiment of the present disclosure.

At least one embodiment of the subject matter of this disclosure is understood by referring to FIGS. 1 through 3 of the drawings.

Referring now to FIG. 1, a vehicle 10 is illustrated in accordance with an embodiment of the present disclosure. FIG. 1 further illustrates a system 12 for controlling air movement through the vehicle 10 with a fan 14 of the vehicle 10. In the illustrated embodiment, the vehicle 10 is a front loader or similar construction vehicle having the fan 14 located at a fan end 16 of the vehicle 10 and a front work tool 32 located at a non-fan end 22 of the vehicle 10 opposite the fan end 16 of the vehicle 10. In additional embodiments not illustrated, the vehicle 10 is another type of vehicle configured for on-road or off-road use including, without limitation, an agricultural vehicle, a construction vehicle, a forestry vehicle, or a utility vehicle. Further, although the fan end 16 is shown as the rear end of the vehicle 10 in FIG. 1, in particular embodiments, the fan 14 is located at the front of the vehicle 10 such that the fan end 16 is the front end or end having the front work tool 32. As described herein, the front and rear ends of the vehicle 10 are relative to operator-controlled direction of travel of the vehicle 10. The vehicle 10 of FIG. 1 includes a plurality of ground engaging members 40 that may include, without limitation, wheels, tracks, or other means to provide travel for the vehicle 10.

The fan 14 of the illustrated embodiment is mounted to the vehicle 10 in the vehicle 10 at the fan end 16 and is configured to move air relative to the vehicle 10 in an inward direction 18 into the vehicle 10 and/or move air in an outward direction 20 from the fan end 16 away from the vehicle 10 opposite the inward direction 18. In additional embodiments not illustrated, the fan 14 is located outside of the vehicle 10 but is configured to move air in the inward direction 18 and/or the outward direction 20. The fan 14 is configured to move or circulate air through a flowpath 26 defined by a first flowpath end 28 and at least one second flowpath end 30. The second flowpath end 30 in the illustrated embodiment includes two ends 30 as the flowpath 26 is split in the vehicle 10 as illustrated in FIG. 1. One or more grille(s) or screen(s) 24 are located at the first flowpath end(s) 28 and/or the second flowpath end(s) 30. In additional embodiments not illustrated, one or multiple fan(s) 14 may be located on one or more second flowpath end(s) 30 or at another location at the fan end 16 of the vehicle 10. Further, the flowpath 26 may extend through and/or terminate at other portions of the vehicle 10.

The vehicle 10 and system 12 illustrated in FIG. 1 include an object detector 42 mounted at the fan end 16 of the vehicle 10. The object detector 42 detects or is configured to detect an object 44 or objects 44 within a detection distance 46 from the fan end 16 of the vehicle 10. The object(s) 44 includes debris, leaves, mulch, or other organic materials, waste or paper materials, or any other materials capable of being moved with the movement of air when the air is moving in the inward direction 18. In additional embodiments not illustrated, the object detector 42 is not located at the fan end 16 but is located on a separate portion of the vehicle 10, on a separate structure or vehicle, or at another location capable of determining that one or more objects 44 are located within the detection distance 46.

The object detector 42 in an embodiment is a radar sensor, but it will be appreciated that the object detector 42 may include one or more of a laser, sonar, infrared, or other sensor or system capable of detecting the object 44 within the detection distance 46. Further, the object detector 42 may include two or more sensors, one or more of which being mounted on the vehicle 10 and/or mounted away from the vehicle 10.

The vehicle 10 and the system 12 illustrated in FIG. 1 further includes a controller 48 controlling or being configured to control actuation of the fan 14 based on detection of the object(s) 44 within the detection distance 46 at the fan end 16 of the vehicle 10. The controller 48 of various embodiments is located at any location of the vehicle 10 or any location that is remote or separate from the vehicle 10. As used herein, both terms "object" and "objects" may include one or a plurality of objects. As a non-limiting example, the object 44 as described herein may include both a pile of debris and each piece of debris, individually. Similarly, in such a non-limiting example, the pieces of debris may be referred to as the objects 44.

As shown in FIG. 1, the object detector 42 of an embodiment determines or is configured to determine an object distance 60 of the object 44 from the fan end 16 of the vehicle 10 within the detection distance 46. In a particular embodiment, the object distance 60 includes a plurality of zones A, B, C, D. As illustrated in FIG. 1, zone D represents the greatest object distance 60 for the object 44 from the fan end 16 of the vehicle 10 within the detection distance 46, and A represents the smallest object distance 60 with zones B and C representing intermediate object distances 60. Object 44 of the illustrated embodiment is detected at zone B. Therefore, the controller 48 and/or the object detector 42 determines the object distance 60 to be the distance represented by zone B. It will be appreciated that, in further embodiments, the object detector 42 determines the object distance 60 in accordance with other methods or any other number or configuration of zones or ranges. In particular embodiments, and as described in further detail below, the controller 48 is further configured to control actuation of the fan 14 to be proportional to the object distance 60 of the object(s) 44 from the fan end 16 of the vehicle 10. In a non-limiting illustrative example, the controller 48 reduces a speed of the fan 14 the closer the object(s) 44 is/are sensed as being located from the fan end 16 of the vehicle 10.

In an embodiment of the present disclosure, the controller 48 is configured to control actuation of the fan 14 to prohibit, reduce the duration of, or otherwise limit movement of air in the inward direction 18 based on detection of the object 44 within the detection distance 46 at the fan end 16 of the vehicle 10. In one embodiment, the fan 14 operates normally to move air in the outward direction 20 but rarely, occasionally, or frequently reverses rotational direction or otherwise changes operation to move air in the inward direction 18, such as to clear debris or objects from the screen(s) 24 or a heat exchanger or other component in the flowpath 26. In such an embodiment, if the object detector 42 detects the object 44 within the detection distance 46, the controller 48 will not reverse rotation or otherwise move air in the inward direction 18 while the object 44 is detected within the detection distance 46. Such a prohibition or limitation by the controller 48 will reduce or prevent the ingestion of the object(s) 44 into the flowpath 26, prevent movement of the object(s) 44 toward the screen(s) 24, and/or limit the amount of objects 44 ingested into the flowpath 26 or moved toward the screen(s) 24.

In an embodiment of the present disclosure, the controller 48 is configured to control a speed of the fan 14, such as when the fan 14 is operating to move air in the inward direction 18, based on detection of the object(s) 44 within the detection distance 46 at the fan end 16 of the vehicle 10. Similarly, in another embodiment of the present disclosure, the controller 48 is configured to control a blade pitch angle of the fan 14, such as when the fan 14 is operating to move air in the inward direction 18, based on detection of the object(s) 44 within the detection distance 46 at the fan end 16 of the vehicle 10. In one or more additional embodiments not illustrated, the fan 14 includes multiple fans 14 in parallel or series configuration. In an embodiment, the controller 48 is configured to control one or more of a plurality of fans 14 to be activated or deactivated or otherwise modulated to modify a volume of air being moved in the inward direction 18 into the flowpath 26 based on detection of the object(s) 44 within the detection distance 46 at the fan end 16 of the vehicle 10.

FIG. 2 illustrates a chart 52 of fan speed 62 of the fan 14 for temperature values 50 and detection of the object 44 within the detection distance 46. The controller 48 of an embodiment controls actuation of the fan 14 upon detection of the object 44 in accordance with the fan speed 62 for the temperature values 50. The temperature values 50 of the chart 52 reference a fluid temperature range from a minimum (0) to a maximum (10) value in a radiator, cooler, heat exchanger, or other component (not shown) in the flowpath 26 and having coolant or another fluid that is affected by the movement of air via the fan 14. The fan speed 62 of the chart 52 is reflected as a percentage of the full speed of the fan 14. Line 64 represents the object 44 being detected at zone A, line 66 represents the object 44 being detected at zone B, line 68 represents the object 44 being detected at zone C, and line 70 represents the object 44 being detected at zone D. In the illustrated embodiment, the fan speed 62 does not fall below 25% of full speed, but in other embodiments not illustrated, the fan speed 62 may fall to any point including 0%. As illustrated, the highest fan speed 62 for the object 44 detected at zone D is 100%, the highest fan speed 62 for the object 44 detected at zone C is 75%, the highest fan speed 62 for the object 44 detected at zone B is 50%, and the highest fan speed 62 for the object 44 detected at zone A is 25%. It will be appreciated that the fan speeds 62, the number, size, and shape of the zones, temperature range and values, and curves of the lines 64-70 may vary based on several considerations including, without limitation, object type in the travel area, configuration and size of the vehicle 10, configuration and performance of the fan(s) 14 of the vehicle 10, and any heat exchangers or other vehicle components found with or utilizing the flowpath 26.

Referring again to FIG. 1, at a given point for an embodiment, the vehicle 10 is configured to operate in a travel direction state of a forward travel direction 80 or a reverse travel direction 82 opposite from the forward travel direction 80. The fan 14 of the illustrated embodiment is configured to move air in the outward direction 20, which is codirectional with the reverse travel direction 82, and the inward direction 18, which is codirectional with the forward travel direction 80. The controller 48 in such an embodiment is configured to control actuation of the fan 14 to prohibit, reduce the volume or duration of, or otherwise limit movement of air in the inward direction 18 in accordance with any actuation steps described herein (e.g., flow direction limitation, fan speed reduction) based on detection of the object(s) 44 within the detection distance 46 at the fan end 16 of the vehicle 10 and operation of the vehicle 10 in a travel direction state opposite from the inward direction 18, or the reverse travel direction 82 in the illustrated embodiment. Operation of the vehicle 10 in a particular travel direction state refers to an actual movement direction or a transmission state for the vehicle 10 (e.g., the transmission of the vehicle 10 being in a reverse gear). A non-limiting example of such control based on detection of the object(s) 44 may be illustrated in the following chart.

| Object Detection Zone | Travel Direction State | Fan Reversal Action |
|---|---|---|
| Zone D | Forward | None |
| Zone C | Forward | None |
| Zone B | Forward | None |
| Zone A | Forward | Inhibit Reversal |
| Zone D | Reverse | None |
| Zone C | Reverse | None |
| Zone B | Reverse | Inhibit Reversal |
| Zone A | Reverse | Inhibit Reversal |

As shown above for a non-limiting example, operation of the fan 14 of one embodiment continues as normal until the object 44 is detected within zone A if the vehicle 10 is in a forward travel direction state. However, operation of the fan 14 continues as normal until the object 44 is detected within either zones A or B if the vehicle 10 is in a reverse travel direction state.

It will be appreciated that any one or more actuation steps and/or control inputs described in the various embodiments herein may be combined in particular embodiments to prevent or limit movement of air in the inward direction 18. In a non-limiting illustrative example, the controller 48 is configured to control actuation of the fan 14 by both controlling a speed of the fan 14 upon satisfaction of a first condition and prohibiting further actuation of the fan 14 to move air in the inward direction 18 upon satisfaction of another condition based on detection of the object(s) 44 within the detection distance 46.

Referring now to FIG. 3, a method 100 of controlling air movement through the vehicle 10 with the fan 14 of the vehicle 10 is illustrated. The method 100 includes moving, at step 110, the vehicle 10 toward the object 44. The method 100 of the illustrated embodiment includes detecting, at step 112, the object 44 within the detection distance 46 at the fan end 16 of the vehicle 10. The method 100 may include, in an embodiment, determining the object distance of the object 44 from the fan end 16 of the vehicle 10 within the detection distance 46. The method 100 includes controlling, at step 114, actuation of the fan 14 based on the detecting of the object 44 within the detection distance 46 at the fan end 16 of the vehicle 10.

In additional embodiments, the method 100 further includes determining the object distance 60 of the object 44 from the fan end 16 of the vehicle 10 within the detection distance 46 and controlling actuation of the fan 14 to be proportional to the object distance 60 of the object 44 from the fan end 16 of the vehicle 10. The method 100 may further include, in additional embodiments, moving air with the fan 14 in the outward direction 20 from the fan end 16 of the vehicle 10 and in the inward direction 18 into the fan end 16 of the vehicle 10 opposite from the outward direction 20 and limiting or prohibiting movement of the air in the inward direction 18 based on detection of the object 44 within the detection distance 46 at the fan end 16 of the vehicle 10. The method 100 may further include, in additional embodiments, controlling the speed of the fan 14 based on detection of the object 44 within the detection distance 46 at the fan end 16 of the vehicle 10. The method 100 may include, in additional embodiments, controlling a blade pitch angle of the fan 14 based on detection of the object 44 within the detection distance 46 at the fan end 16 of the vehicle 10. The method 100 may further include, in additional embodiments, operating the vehicle 10 in the forward travel direction 80 or the reverse travel direction 82 and prohibiting, reducing the volume or duration of, or otherwise limiting movement of air into the vehicle 10 at the fan end 16 based on detection of the object 44 within the detection distance 46 at the fan end 16 of the vehicle 10 and operation of the vehicle 10 in the reverse travel direction 82.

Without in any way limiting the scope, interpretation, or application of the claims appearing below, it will be appreciated that the vehicle 10, the system 12, and the method 100 of the embodiments of the present disclosure prevent or reduce the likelihood of ingestion of the object(s) 44 into the flowpath 26, prevent or reduce the likelihood of movement of the object(s) 44 toward the screen(s) 24, and/or limit the amount of objects 44 ingested into the flowpath 26 or moved toward the screen(s) 24. Accordingly, air flowing through the flowpath 26 is maintained and/or maximized such that the performance, efficiency, and life of any heat exchanger or other component in the flowpath 26 is improved. Further, the vehicle 10, the system 12, and the method 100 allow such selective actuation during detection of the object(s) 44 while maintaining a controlled volumetric airflow to provide sufficient air in the flowpath 26 for uninterrupted operation of the vehicle 10 and the system 12.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A vehicle comprising:
    a fan mounted to the vehicle and configured to move air at a fan end of the vehicle;
    an object detector mounted at the fan end of the vehicle and configured to detect an object located outside of the vehicle within a detection distance from the fan end of the vehicle; and
    a controller configured to control actuation of the fan based on detection of the object within the detection distance at the fan end of the vehicle;
    wherein the object detector is configured to detect the object being spaced away from the vehicle by an object distance within the detection distance.

2. The vehicle of claim 1, wherein the fan is configured to move air in an outward direction from the fan end of the vehicle and in an inward direction opposite from the outward direction, and wherein the controller is configured to control actuation of the fan to limit movement of air in the inward direction based on detection of the object within the detection distance at the fan end of the vehicle.

3. The vehicle of claim 2, wherein the controller is further configured to control a speed of the fan based on detection of the object within the detection distance at the fan end of the vehicle.

4. The vehicle of claim 1, wherein the controller is configured to control a speed of the fan based on detection of the object within the detection distance at the fan end of the vehicle.

5. The vehicle of claim 1, wherein the controller is configured to control a blade pitch angle of the fan based on detection of the object within the detection distance at the fan end of the vehicle.

6. The vehicle of claim 1, wherein the object detector is further configured to determine the object distance of the object from the fan end of the vehicle within the detection distance, and wherein the controller is further configured to control actuation of the fan to be proportional to the object distance of the object from the fan end of the vehicle.

7. The vehicle of claim 1, wherein the vehicle is configured to operate in a travel direction state of one of a forward travel direction and a reverse travel direction opposite from the forward travel direction, wherein the fan is configured to move air in an outward direction from the fan end of the vehicle and an inward direction into the vehicle at the fan end and opposite from the outward direction, and wherein the controller is configured to control actuation of the fan to limit movement of air in the inward direction based on detection of the object within the detection distance at the fan end of the vehicle and operation of the vehicle in a travel direction state opposite from the inward direction.

8. A system for controlling air movement through a vehicle with a fan of the vehicle, the system comprising:
    an object detector configured to detect an object located outside of the vehicle within a detection distance from the vehicle; and
    a controller configured to control actuation of the fan based on detection of the object within the detection distance;
    wherein the object detector is configured to detect the object being spaced away from the vehicle by an object distance within the detection distance.

9. The system of claim 8, wherein the controller is further configured to control actuation of the fan to limit movement of air in an inward direction into the vehicle at the fan end based on detection of the object within the detection distance at the fan end of the vehicle.

10. The system of claim 9, wherein the controller is further configured to control a speed of the fan based on detection of the object within the detection distance at the fan end of the vehicle.

11. The system of claim 8, wherein the controller is further configured to control a speed of the fan based on detection of the object within the detection distance at the fan end of the vehicle.

12. The system of claim 8, wherein the controller is further configured to control a blade pitch angle of the fan based on detection of the object within the detection distance at the fan end of the vehicle.

13. The system of claim 8, wherein the object detector is further configured to determine the object distance of the object from the fan end of the vehicle within the detection distance, and wherein the controller is further configured to control actuation of the fan to be proportional to the object distance of the object from the fan end of the vehicle.

14. The system of claim 8, wherein the controller is further configured to control actuation of the fan to limit movement of air into the vehicle at the fan end based on detection of the object within the detection distance at the fan end of the vehicle and operation of the vehicle in a travel direction opposite from the movement of the air into the vehicle at the fan end.

15. A method of controlling air movement through a vehicle with a fan of the vehicle, the method comprising:
    moving the vehicle toward an object located outside of the vehicle;
    detecting the object being spaced away from the vehicle by an object distance within a detection distance at a fan end of the vehicle; and
    controlling actuation of the fan based on the detecting of the object within the detection distance at the fan end of the vehicle.

16. The method of claim 15, further comprising:
    determining the object distance of the object from the fan end of the vehicle within the detection distance; and
    controlling actuation of the fan to be proportional to the object distance of the object from the fan end of the vehicle.

17. The method of claim 15, further comprising:
    moving air with the fan in an outward direction from the fan end of the vehicle and in an inward direction into the fan end of the vehicle opposite from the outward direction; and limiting movement of the air in the inward direction based on detection of the object within the detection distance at the fan end of the vehicle.

18. The method of claim 15, further comprising:
controlling a speed of the fan based on detection of the object within the detection distance at the fan end of the vehicle.

19. The method of claim 15, further comprising:
controlling a blade pitch angle of the fan based on detection of the object within the detection distance at the fan end of the vehicle.

20. The method of claim 15, further comprising:
operating the vehicle in one of a forward travel direction and a reverse travel direction; and
limiting movement of air into the vehicle at the fan end based on detection of the object within the detection distance at the fan end of the vehicle and operation of the vehicle in the reverse travel direction.

* * * * *